United States Patent [19]

Rudy et al.

[11] 4,155,561
[45] May 22, 1979

[54] SEALING DEVICE

[76] Inventors: John V. Rudy; Gunter Schlicht, both of 1220 Franklin St., Oakland, Calif. 94612

[21] Appl. No.: 878,759

[22] Filed: Feb. 17, 1978

Related U.S. Application Data

[63] Continuation of Ser. No. 695,195, Jun. 11, 1976, abandoned.

[51] Int. Cl.² ............... F16J 15/06; F16L 23/02
[52] U.S. Cl. ................ 277/168; 277/235 B; 285/368
[58] Field of Search ............ 277/105, 168–170, 277/228, 235 R, 235 B; 285/363, 364, 368

[56] References Cited

U.S. PATENT DOCUMENTS

| | | | |
|---|---|---|---|
| 2,289,164 | 7/1942 | Arnold et al. | 285/368 |
| 2,829,793 | 4/1958 | Baumann | 285/368 |
| 3,141,686 | 7/1964 | Smith et al. | 285/368 |
| 3,498,643 | 3/1970 | Reiss | 285/368 |

Primary Examiner—Robert S. Ward, Jr.
Attorney, Agent, or Firm—Bielen and Peterson

[57] ABSTRACT

A sealing device for use between two faces utilizing gasket means for making contact with the faces. The gasket means includes at least one gasket member having a flat surface. The sealing element also includes a grooved element which accomodates the gasket means such that the gasket member fits into a groove of substantially curvilinear cross sectional configuraton. Initially, one of the flat surfaces of the gasket member extends beyond the confines of the groove but deforms to move into the groove upon the application of force directed to bring the faces together.

9 Claims, 12 Drawing Figures

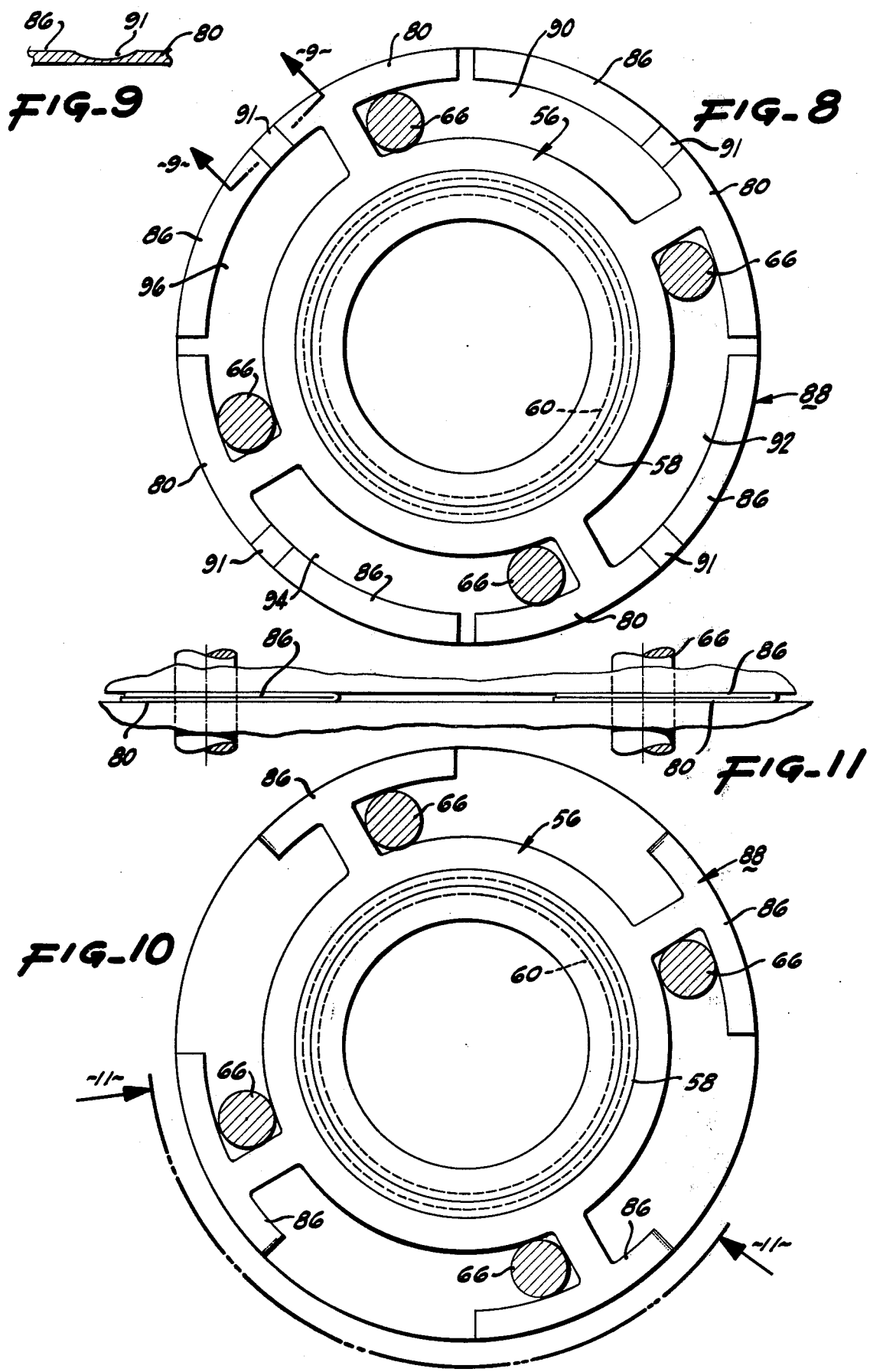

SEALING DEVICE

This is a continuation of application Ser. No. 695,195 filed June 11, 1976, now abandoned.

BACKGROUND OF THE INVENTION

The present invention relates to a novel device to seal the space between two faces.

Establishment of seals between two bodies has developed from the need to transport, store, or contain flowable materials. Pipe joints, flanges and other fittings requiring sealing devices has further evolved from the pressure or vacuum retention of flowable materials within a system.

Early sealing devices include simple cork gaskets squeezed between two faces such as flanges, washers and the like. Later devices revealed the inclusion of squared grooves in the faces to hold specialized O-ring gaskets. O-rings have the disadvantage of being unable to fill the entire channel in which they are placed, thus shifting position with the application of pressure resulting in fluid leaking. Also, the use of two O-rings on opposing faces is not practical in effecting a seal.

A later development in ring seals is disclosed in U.S. Pat. No. 3,671,046 issued June 20, 1972 to Hagmann. The Hagmann seal employs a special groove which includes a single inclined side wall disposed at an angle between 5° and 27° with respect to a flat bottom wall. The groove also includes a substantially vertical second sidewall forming a somewhat irregular trapezoidal shape. Although advancing the art of sealing mechanisns, the Hagmann device lacks the ability to adapt to positive fluid pressures or negative fluid pressures without alteration. In addition, the fluid pressure bearing surface of the Hagmann gasket is relatively small, thus minimizing the sealing force of the fluid pressure.

SUMMARY OF THE INVENTION

In accordance with the present invention, a novel sealing device is provided utilizing at least one gasket means for contacting two opposing faces. The gasket member has a flat surface and may be polygonal in its cross sectional configuration.

The device in one of its embodiments describes a gasket member having a symmetrical cross sectional configuration, including at least one flat surface. For example, the gasket member may be square, rectangular, trapezoidal and the like.

The sealing device further entails a special grooved element to accomodate the gasket means. In its elementary form the element has at least one groove of a substantially curvilinear cross sectional configuration. The single gasket member form of the invention sits within the grooved element having its flat surface extending outside the confines of the substantially curvilinear groove. The gasket means and the grooved element seal the space between the two opposing faces when the flat surface of the gasket member contacts one of the opposing faces. Upon the application of pressure the gasket member deforms to move into the groove.

The grooved element may be integral with one of the faces or may materialize in a flat member disposed between the faces. The flat member incorporates a pair of grooves of substantially curvilinear cross sectional configuration located on its opposite flat surfaces. The gasket means takes the form of a pair of gasket members each having a flat surface. Again, each of the grooves accomodates each of the gasket members such that the gasket members flat surfaces extend outside the confines of the grooves. The flat surfaces of the gasket members each contact one of the opposing faces and move completely into each of the grooves when a mating force applies to the opposing faces.

The invention embraces the case where the two opposing faces are flange faces and the gasket member is an endless member therebetween. Where at least one of the flanges has a raised portion for example, a raised face, the flat member evinces at least two appendages, one of which folds over the other to form a sandwich. Thus, the sandwich shims or fills the space between the flanges away from the gooved element, which prevents rotation and excessive stressing of the flanges upon tightening of the same.

The invention may be construed to include a sealing retainer having a flat member placed between two opposing faces with at least one face having a raised portion. A plurality of openings within the flat member permits the passage of fastening means, such as bolts, clamps, set screws and the like, which force the opposing faces together. A pair of appendages, one foldable over the other, shims the space between the faces.

The retainer has sealing means disposed on the flat member to sealingly engage the faces. The sealing means may include a pair of grooves of substantially curvilinear cross sectional configuration. A pair of gasket members each having a flat surface. The gasket members take a symmetrical cross sectional configuration to permit its usage with pipe flanges supporting a vacuum or positive pressure within the pipes.

The substantially curvilinear configuration of the grooved element allows the formation of an initial dam by the gasket means when it contacts at least one of the faces. Subsequent squeezing pressure exerted by the opposing faces avoids excessive deformation of a portion of the gasket means beyond its elastic limit. The resulting seal is superior in resisting pressures directed against the seal.

It is therefore an object of the present invention to provide a sealing device which possesses superior sealing engagement between two opposing surfaces.

It is another object of the present invention to provide a device for use between flanges having raised and unraised faces in any combination to form a seal thereabout which prevents the escape of the contents of the conduits to which the flanges attach.

It is yet another object of the present invention to provide a sealing device which employs a special groove configuration and gasket means with a special surface configuration which act in concert to form a sealing format between two opposing faces which permit the acceptance of pressure from a body relatively tangential to the pressure exerted between the opposing faces.

Another object of the present invention is to provide a sealing device between two opposing faces which maintains its seal under negative or positive pressure without juxtaposition of elements of the device.

Yet another object of the present invention is to provide a sealing retainer which has a sealing means and a grooved element as well as a pair of appendages foldable at a weakened point therebetween to shim the space between opposing faces possessing raised portions.

Another object of the present invention is to provide a sealing device which employs a grooved member and sealing means between opposing faces which entirely fills the grooved element under the force tending to bring together the faces while the sealing device resists high pressures tending to disrupt the established seal.

The invention possesses other objects and advantages especially as concerns particular features and characteristics thereof which will become apparent as the specification continues.

Various aspects of the present invention will evolve from the following detailed description of the preferred embodiments thereof which should be taken in conjunction with the accompanying drawings.

BRIEF DESCRIPTION OF THE DRAWINGS

FIG. 8 is a view taken along line 9—9 of FIG. 6.

FIG. 9 is a view taken along line 9—9 of FIG. 8.

FIG. 10 is a view taken along line 10—10 of FIG. 7.

FIG. 11 is a view taken along line 11—11 of FIG. 10.

DESCRIPTION OF THE PREFERRED EMBODIMENTS

Figure 1:
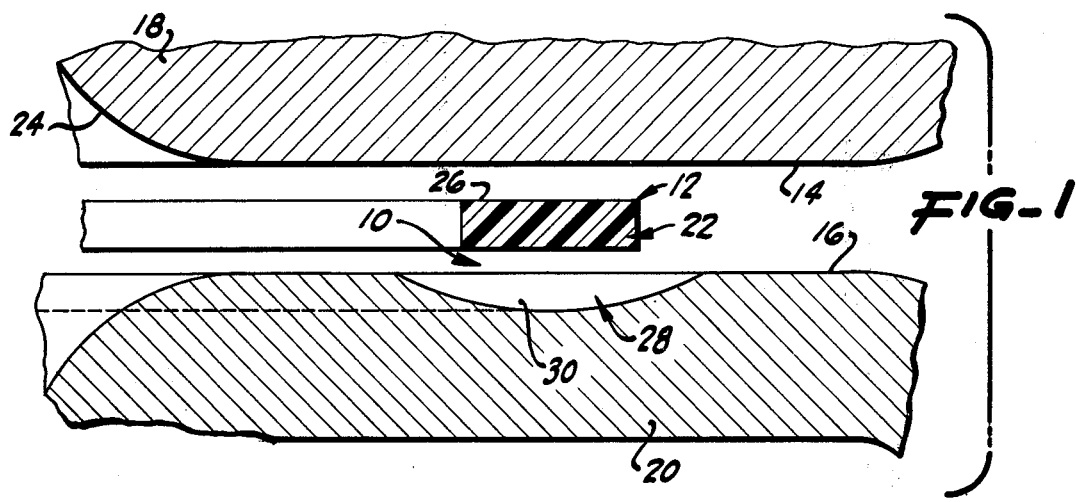
FIG. 1 is a partially broken sectional view of the device.

The invention as a whole is depicted in the drawings by the reference character 10 and includes as one of its elements gasket means 12 disposed between opposing surfaces or faces 14 and 16 of opposing elements 18 and 20.

The gasket means 12 may be constructed of any sealing material such as, but not limited to, Teflon, asbestos, elastomers such as neoprene, fluorosilicon, butyl rubber, nitrile, ethylene propylene and the like. As depicted in FIG. 1 the gasket means 12 may include at least a single gasket member 22.

The faces 14 and 16 may be smooth or possess regular or irregular surface characteristics. Where elements 18 and 20 are flanges, FIGS. 1-7, the faces 14 and 16 may take the form of concentric crevices, referred to in the art as a serrated or phonographic surface. Flanges manifest themselves in a variety of shapes and materials, well know in the art, including flat-faced and raised faced types constructed of carbon steel, galvanized steel, stainless steel, aluminum, copper, and the like.

The gasket member 22 in a flange environment often is an endless member fitting in an endless groove, conduit space 24 transporting a flowable material. As depicted in the accompanying drawings the gasket member has a flat surface 26. The cross sectional configuration of the gasket member 22 may be polygonal, but is illustrated as rectangular by way of example.

Figure 2:
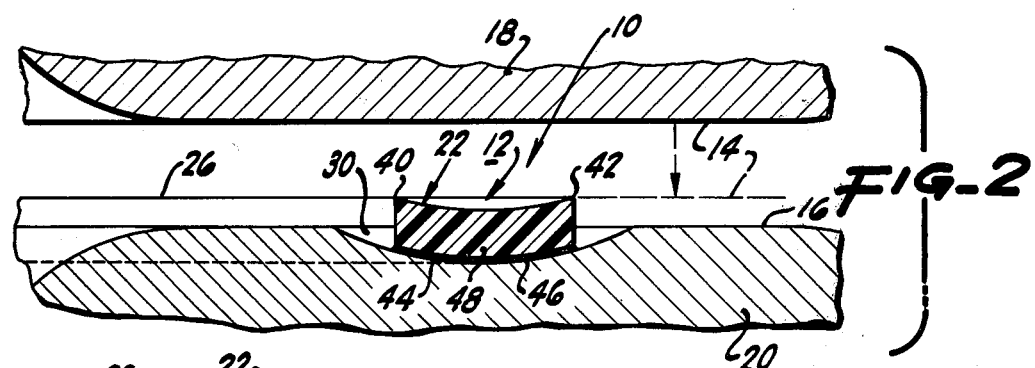
FIG. 2 is a partially broken sectional view of the device upon initial contact of the elements.
Figure 2A:
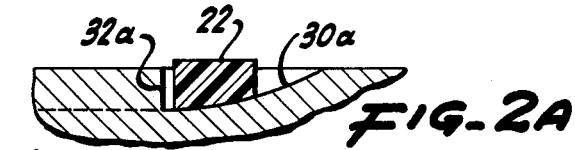
FIG. 2A is a partially broken sectional view of an embodiment of the device.

The gasket member 22 initially positions within a grooved element 28 which has at least one groove 30 of substantially curvilinear cross sectional configuration, FIGS. 1-4. Manufacturing expedient may result in a groove having slight straight portions 32, 34, 36 and 38, FIG. 5, which do not interfere with the workability of the curvilinear groove 30. Also, FIG. 2A depicts another conception of a substantially curvilinear groove 30a having a straight portion 32a.

Before any pressure applies to gasket member 22, flat surface 26 extends outside of the confines of the substantially curvilinear groove 30. The flat surface 26 contacts face 14 when forced closer to face 16 (shown in phantom, FIG. 2) at edge portions 40 and 42 forming the initial sealing dam to resist fluid pressure emanating from conduit space 24. As shown in the drawings the gasket members surface 44 may be fixed into place with fastening means 46 such as mastic or glue to prevent accidental dislocation during manipulation of the opposing elements 18 and 20. Because of the curviture of the groove 30, the center portion 48 of the gasket member 22 will sag from the face 14, after placement of the gasket member 22 within groove 30.

Figure 3:
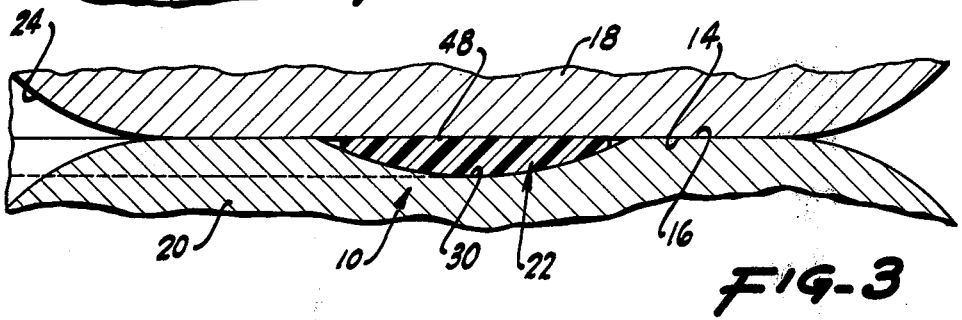
FIG. 3 is a partially broken sectional view of the device after the application of mating force.

Further force tending to mate or bring together faces 14 and 16 deforms the gasket member to move into the groove 30, FIG. 3. Of course, the gasket member 22 sizes to fill a good portion of groove 30 without over filling the same. This would cause feathering out of the gasket member 22, to disrupt the mating of surfaces 14 and 16 and weaken the seal formed by the device 10. The gasket member central portion 48 deforms slightly but, with the use of materials having a memory, remains within its elastic limit during the mating process of surfaced 14 and 16. This feature greatly enhances the ability of device 10 to resist fluid pressure, FIG. 4, which tends to break the seal formed thereby. Also, device 10 will increase its sealing ability with an increase in pressure, as well as, maintain its seal under fluctuating and reversing pressures.

Figure 4:
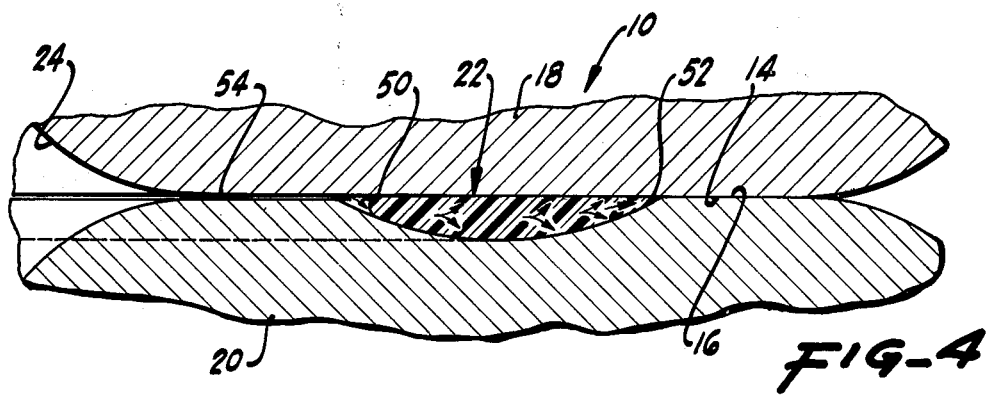
FIG. 4 is a partially broken sectional view of the device under fluid pressure.

Directional arrows, FIG. 4, delineates a fluid pressure for conduit space 24 which acts on gasket member end 50. It presents a greater surface area, and therefore, a greater wedging force on gasket member end 52 with an increase in fluid pressure. The resilient center portion 48 of elastomeric gasket members also resists fluid pressure by dint of its memory. Thus, the application of fluid pressure energizes resistance to breakage of the seal formed with device 10. The positive pressure of the fluid has been emphasized in FIG. 4 by the creation of gap 54 therein; vacuum pressure would work oppositely. The device 10 has been found to maintain a seal at fluid pressures in excess of 300,000 kilograms per square meter and maintain this pressure after reduction of the mating force of opposing elements 18 and 20 to the point where there is separation therebetween. Minimal deformation of the gasket member also promotes longevity of the sealing device 10.

The device 10 successfully holds its seal under positive pressure or vacuum and may perform this function uniformly when gasket member 22 is symmetrical in cross sectional configuration.

Figure 5:
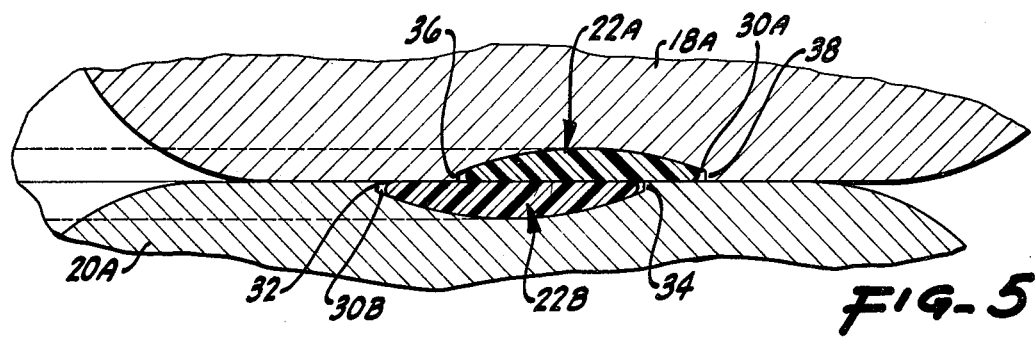
FIG. 5 is a partially broken sectional view showing an offset mating of a pair of sealing devices.

FIG. 5 illustrates the additional advantage of the device 19 which is the securing of a seal between opposing elements 18A and 20A utilizing substantially curvilinear grooves 30A and 30B and gasket members 22A and 22B although the gasket members misalign.

Figure 6:
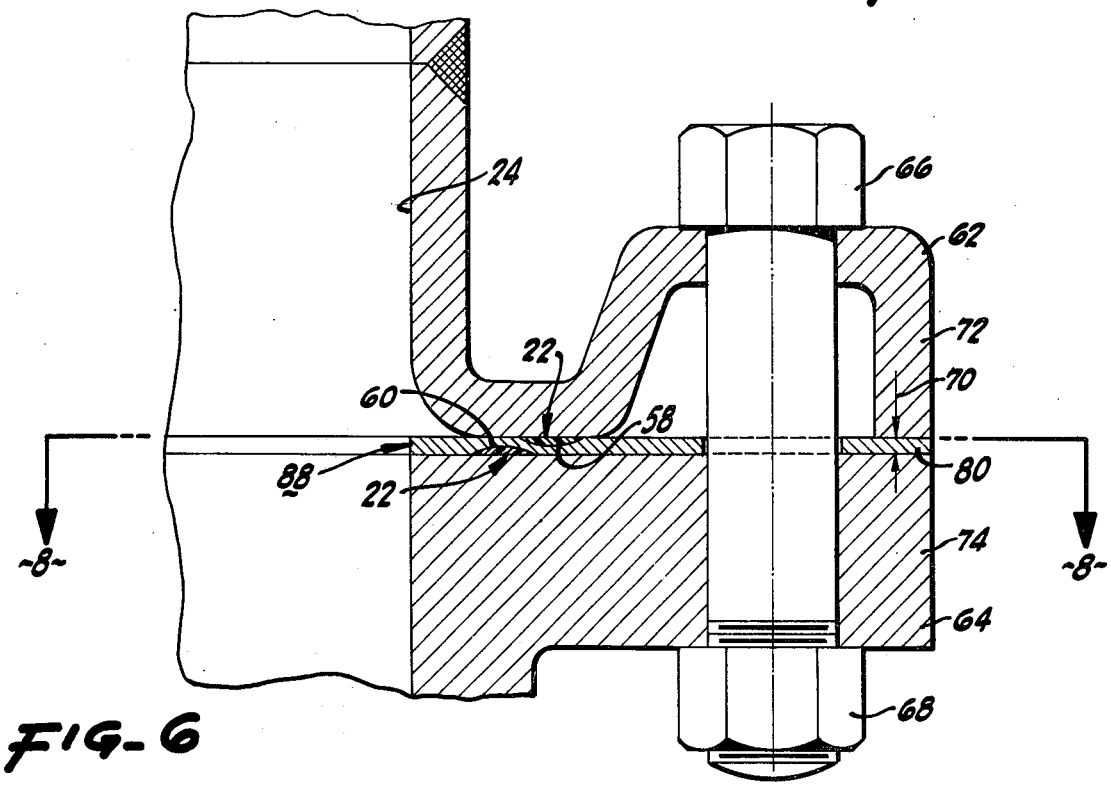
FIG. 6 is a partially broken sectional view of the invention in place with mated dissimilar flanges.
Figure 7:
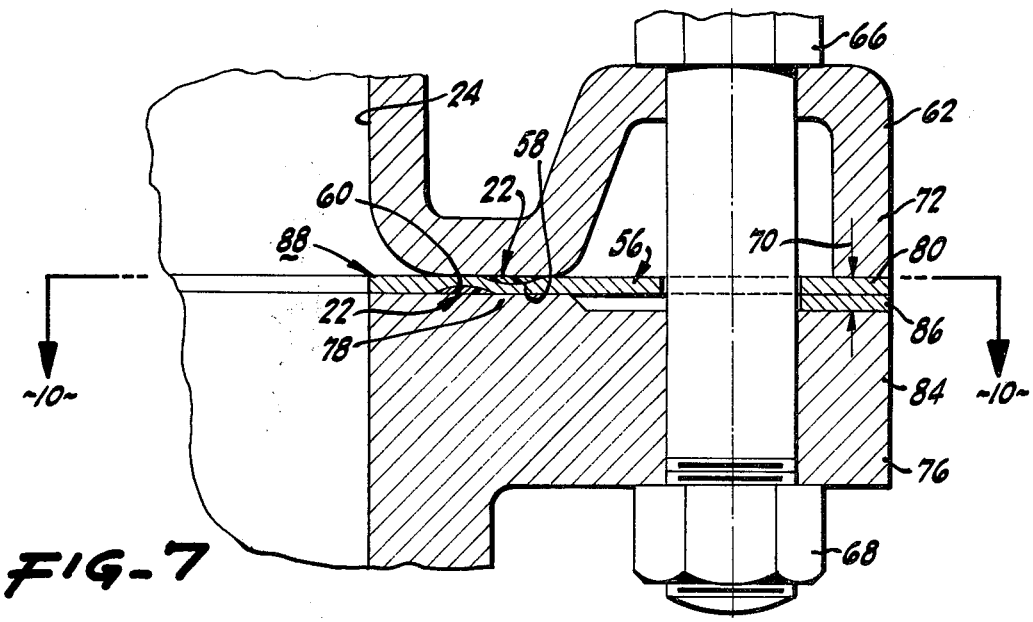
FIG. 7 is a partially broken sectional view of the invention including a flat member having curvilinear grooves placed with mated dissimilar flanges.

The grooved element 28 may be integral with one of the faces 14 and 16 of opposing elements 18 and 20, FIGS. 1-5, or may also include a flat member 56 disposed between elements 18 and 20. As shown in FIGS. 6 and 7, the flat member 56 includes substantially curvilinear grooves 58 and 60 each containing a gasket member 22. Dissimilar flanges 62 and 64 mate through the force exerted by threaded bolt 66 and threaded nut 68. Appendages 80 and 86 of flat member 56 serve to fill the gap 70 found between the dissimilar flanges outer portions 72 and 74 insuring a tight fit. Flange 62 is of the type found in U.S. Pat. No. 3,794,363 issued Feb. 26, 1974, to Schulz. Gap 70 may vary in size, but is generally about 1.5 millimeters in height.

When a flange 76 opposing flange 62 has a raised face 78, a larger gap forms between outer portions 72 and 84, tightened by threaded bolt 66 and threaded nut 68. Flat member 56 may be constructed to attach to at least two apendages 80 and 86, one foldable over the other, FIGS. 8-11.

The device 10 may embody in a sealing retainer 88 which includes flat member 56 having at least two appendaged 80 and 86, FIGS. 8-11. A plurality of openings 90, 92, 94 and 96 permit the passage of fastening means exemplified by bolts 66. As most clearly shown in FIG. 9, the appendages 80 and 86 connect with a weakened portion 90 therebetween, to facilitate the folding process. Appendages 80 and 86, thus shim the gaps 70 and 82 with or without folding, depending on the configuration of the particular flanges employed. The sealing means of retainer 88 may include grooves 58 and 60 of flat member 56, as well as a pair of symmetrical gasket members 22 hereinbefore described.

In operation, device 10 functions when the grooved element 28 accomodating gasket means 12 disposes between opposing elements 18 and 20. Application of force tending to bring the faces 14 and 16 together deforms and moves the gasket member or members within groove 30 or grooves 58 and 60 to form a tight seal between opposing elements.

Where the device 10 embodies in a sealing retainer 88, for use between dissimilar flange, the retainer inserts between such flanges 62, 64, and 76. Appendages 80 and 86 fill gaps 70 and 82. The larger gap 82 shims by folding appendage 80 over appendage 86. Bolts 66 and nuts 68 tighten the flanges and produce the sealing force necessary to effect the seal.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. A sealing device between two faces under the influence of fluid pressure comprising:
    a. gasket means adapted for contacting the faces, said gasket means including at least one gasket member having a flat surface;
    b. a grooved element accommodating said gasket means, said element having at least one groove of a substantially curvilinear cross-sectional configuration, said gasket member's flat surface being intended to contact one of the faces away from said grooved element, said one groove having a volumetric capacity, said gasket member being sized to no more than occupy said volumetric capacity of said one groove after application of force directed to bring the faces together, said gasket means and said grooved element intended to seal the space between the faces against fluid pressure tending to separate the faces after application of the force directed to bring the faces together.

2. The seal of claim 1 in which said gasket member is symmetrical in cross sectional configuration.

3. The seal of claim 2 in which the two faces intended for contacting said gasket member are flange faces and said gasket member is an endless member, and said substantially curvilinear groove is endless.

4. The seal of claim 2 in which said grooved element comprises a flat member disposed between the faces, said flat member including a pair of grooves of substantially curvilinear cross sectional configuration on opposite surface thereof, and said gasket means includes a pair of gasket members each having a flat surface, said grooves accommodating each of said gasket members such that each of said gasket members flat surface extends outside the confines of said grooves.

5. The seal of claim 4 in which said flat member further includes a portion having at least two appendages, one of said appendages foldable in overlying relationship to said other appendage.

6. The seal of claim 5 in which the two faces are flange faces and said gasket member is an endless member and said substantially curvilinear groove is endless.

7. The seal of claim 1 in which said grooved element is adapted to be integrally constructed with one of the faces.

8. The seal of claim 6 in which said gasket member is symmetrical in cross-sectional configuration.

9. The seal of claim 7 in which each of the faces includes a grooved element, each of said grooved elements being integral with one of the faces.

* * * * *